US012428282B2

(12) United States Patent
Danielson et al.

(10) Patent No.: US 12,428,282 B2
(45) Date of Patent: Sep. 30, 2025

(54) BEVERAGE MIXING SYSTEM

(71) Applicant: BarTrack, Inc., Sterling, VA (US)

(72) Inventors: Brett Danielson, Vienna, VA (US); Grant Hobar, Herndon, VA (US); David Atherton, Purcellville, VA (US)

(73) Assignee: BARTRACK, INC., Sterling, VA (US)

( * ) Notice: Subject to any disclaimer, the term of this patent is extended or adjusted under 35 U.S.C. 154(b) by 0 days.

(21) Appl. No.: 18/170,734

(22) Filed: Feb. 17, 2023

(65) Prior Publication Data

US 2023/0257248 A1 Aug. 17, 2023

Related U.S. Application Data

(60) Provisional application No. 63/268,177, filed on Feb. 17, 2022.

(51) Int. Cl.
*B67D 1/00* (2006.01)
*B67D 1/10* (2006.01)
*B67D 1/08* (2006.01)

(52) U.S. Cl.
CPC ........... *B67D 1/0037* (2013.01); *B67D 1/108* (2013.01); *B67D 1/0855* (2013.01); *B67D 1/0888* (2013.01)

(58) Field of Classification Search
CPC .... B67D 1/0037; B67D 1/108; B67D 1/0855; B67D 1/0888; B67D 1/0046; B67D 1/0878; B67D 1/1211; B67D 1/122; B67D 2001/082; B67D 2210/0006
See application file for complete search history.

(56) References Cited

U.S. PATENT DOCUMENTS

| | | | | |
|---|---|---|---|---|
| 6,199,603 | B1 | 3/2001 | Digianfilippo et al. | |
| 7,878,370 | B2 | 2/2011 | Sevcik et al. | |
| 10,315,906 | B1 | 6/2019 | Nicol et al. | |
| 10,465,960 | B2 | 11/2019 | Prabhakaran | |
| 10,562,750 | B2 | 2/2020 | Peirsman et al. | |
| 2007/0205220 | A1* | 9/2007 | Rudick .................... | B67D 1/07 222/145.6 |
| 2009/0069934 | A1 | 3/2009 | Newman et al. | |
| 2011/0017776 | A1* | 1/2011 | Metropulos .......... | B67D 1/0041 222/129.1 |
| 2016/0355389 | A1 | 12/2016 | Bursey et al. | |
| 2017/0088410 | A1 | 3/2017 | Wing et al. | |

(Continued)

FOREIGN PATENT DOCUMENTS

DE 202014106255 U1 * 5/2016 ............. B67D 1/108

*Primary Examiner* — Donnell A Long
(74) *Attorney, Agent, or Firm* — Welsh Flaxman & Gitler LLC

(57) ABSTRACT

A beverage mixing system provides for accurate, convenient, and reliable mixing of liquid ingredients to dispense drinks. The beverage mixing system includes a plurality of containers each including a liquid ingredient, a pumping system in fluid communication with the plurality of containers, and a fluid manifold where liquid ingredients from the plurality of containers are ultimately combined and dispensed. The fluid manifold includes a plurality of inlet ports to which fluid lines are connected fluidically connecting the plurality of containers to the fluid manifold. The beverage mixing system also includes a control system managing operation of the pumping system to ensure proper mixing of the liquid ingredients to produce fresh drinks containing a mix of the liquid ingredients.

7 Claims, 7 Drawing Sheets

(56) References Cited

U.S. PATENT DOCUMENTS

2017/0210610 A1 7/2017 Henson et al.
2019/0135607 A1 5/2019 Petermann
2019/0292037 A1 9/2019 Nicol et al.
2020/0055761 A1* 2/2020 Bissen ................. B67D 1/0032
2020/0079637 A1 3/2020 Kaplita et al.
2021/0261400 A1 8/2021 Danielson et al.
2023/0063855 A1* 3/2023 Comunale ................ B67D 1/07
2023/0119340 A1* 4/2023 Carson ................. B67D 1/0888
222/1

* cited by examiner

BEVERAGE MIXING SYSTEM

CROSS REFERENCE TO RELATED APPLICATION

This application claims the benefit of U.S. Provisional Patent Application Ser. No. 63/268,177, entitled "BEVERAGE MIXING SYSTEM," filed Feb. 17, 2022, which is incorporated herein by reference.

BACKGROUND OF THE INVENTION

1. Field of the Invention

The present disclosure relates generally- to a system for mixing beverages.

2. Description of the Related Art

Fluid dispensing systems are known in the art. However, mixing beverages in the preparation of mixed drinks in bar and restaurant systems is most commonly performed manually. This is time consuming and limits the variety of drinks that are available.

SUMMARY

In one aspect a beverage mixing system provides for accurate, convenient, and reliable mixing of liquid ingredients to dispense drinks. The beverage mixing system includes a plurality of containers each including a liquid ingredient, a pumping system in fluid communication with the plurality of containers, and a fluid manifold where liquid ingredients from the plurality of containers are ultimately combined and dispensed. The fluid manifold includes a plurality of inlet ports to which fluid lines are connected such that the plurality of containers are in fluid communication with the fluid manifold. The beverage mixing system also includes a control system managing operation of the pumping system to ensure proper mixing of the liquid ingredients to produce fresh drinks containing a mix of the liquid ingredients.

In some embodiments the plurality of containers includes a first container storing a pressurized neutral alcohol and a second container storing pressurized seltzer water.

In some embodiments third and fourth containers store different liquid flavoring ingredients.

In some embodiments each of the fluid lines includes an inlet end connected to one of the plurality of containers and in fluid communication with liquid ingredient contained within the one of the plurality of containers and an outlet end connected to a respective inlet port of the fluid manifold.

In some embodiments the fluid manifold includes a central body where the liquid ingredients mix after being pumped from the plurality of containers to the fluid manifold.

In some embodiments the pumping system includes a plurality of pumps.

In some embodiments each of the plurality of pumps is a peristaltic pump positioned in-line with a respective fluid line.

In some embodiments the plurality of containers includes a first container storing a pressurized neutral alcohol and a second container storing pressurized seltzer water.

In some embodiments each of the fluid lines includes an inlet end connected to one of the plurality of containers and in fluid communication with liquid ingredient contained within one of the plurality of containers and an outlet end connected to a respective inlet port of the fluid manifold.

In some embodiments the control system is linked to each of the plurality of pumps and governs how and when each of the plurality of pumps draws liquid from the containers for mixing within the fluid manifold.

In some embodiments the control system includes a plurality of control dials.

In some embodiments each of the plurality of control dials is associated with a pump dictating a rate at which the specific pump dispenses its associate liquid ingredient, and ultimately how much liquid is pumped during a single operating cycle of the beverage mixing system.

In some embodiments the system includes a dispensing tap, wherein upon opening of the dispensing tap pressure is released within the fluid line, which is sensed by the control system, and the plurality of pumps begin pumping liquid ingredients at the predetermined rates.

In some embodiments the system includes flow sensors and environmental sensors.

In some embodiments the system further includes pressure sensors, carbon dioxide sensors, and/or color sensors.

In some embodiments the system further includes pressure sensors, carbon dioxide sensors, and/or color sensors.

Other objects and advantages of the present invention will become apparent from the following detailed description when viewed in conjunction with the accompanying drawings, which set forth certain embodiments of the invention.

BRIEF DESCRIPTION OF DRAWINGS

Aspects of the present disclosure are illustrated by way of example and are not limited by the accompanying figures with like reference numbers indicating like elements.

DESCRIPTION OF THE PREFERRED EMBODIMENTS

Figure 1:
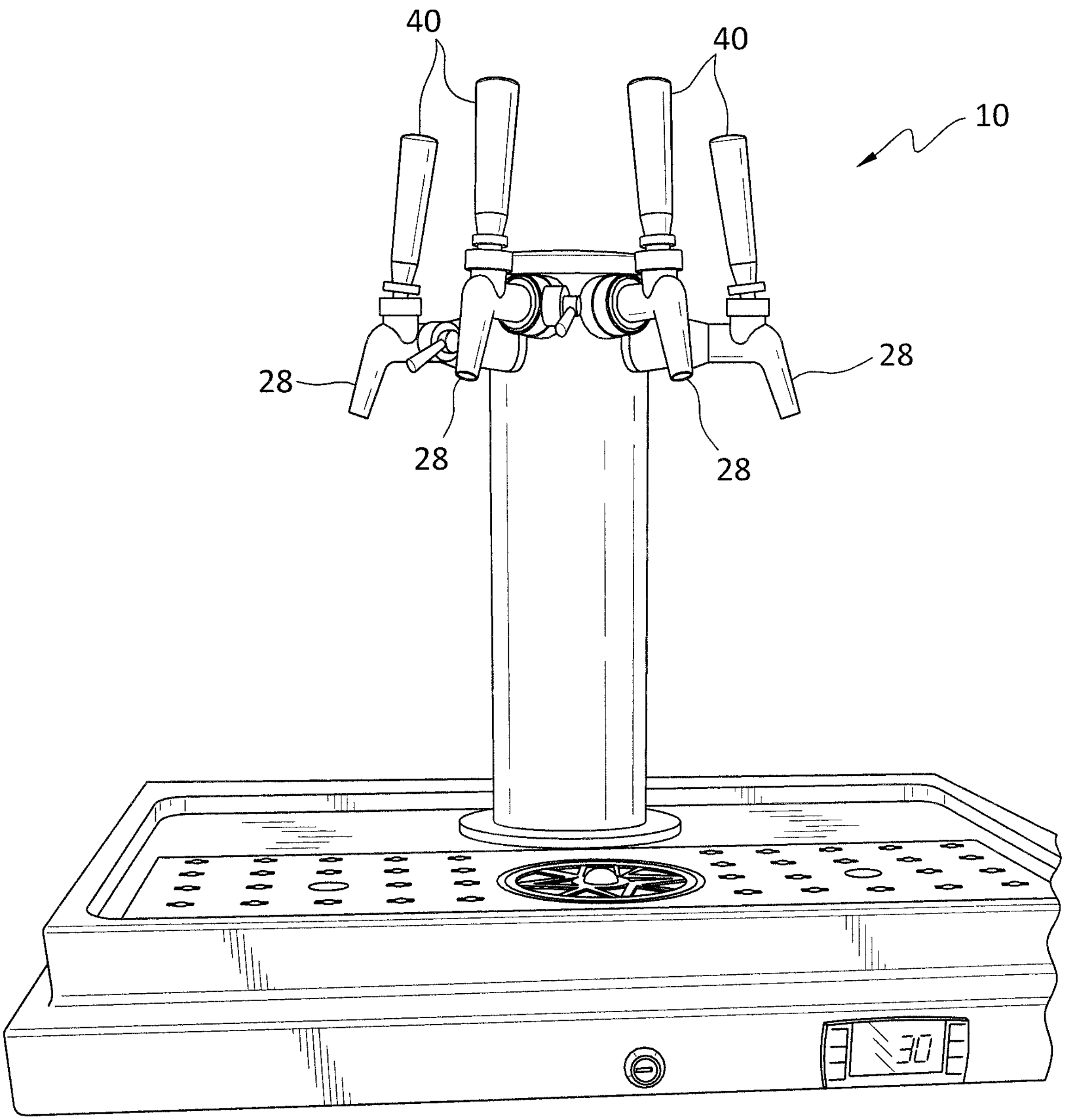
FIG. 1 is a perspective view of an embodiment of a beverage mixing system for mixing various liquid ingredients, wherein four dispensing taps are provided. As shown with reference to FIGS. 2 and 3, as well as the following disclosure, the beverage mixing system may include a single dispensing tap or a plurality of dispensing taps.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, firmware, or in a combined software and hardware implementation that may all generally be referred to herein as a "circuit," "module," "component," or "system." Furthermore, aspects of the present disclosure may take the form of a computer program product embodied in one or more non-transitory computer-readable media having computer-readable program code thereon.

Any combination of one or more non-transitory computer-readable media may be utilized. The non-transitory computer-readable media may be a computer-readable storage medium. A computer-readable storage medium may be, for example, but not limited to, an electronic, magnetic, optical, electromagnetic, or semiconductor system, apparatus, device, or any suitable combination of the foregoing. More specific examples (a non-exhaustive list) of the computer-readable storage medium may comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer-readable storage medium may be any non-transitory medium able to contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer-readable signal medium may be a computer-readable medium that is not a computer-readable storage medium and that is able to communicate, propagate, or transport a program for use by or in connection with an instruction execution system, apparatus, or device. Program code embodied on a computer-readable signal medium may be transmitted using any appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C #, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY®, and Groovy, or other programming languages. The program code may execute entirely on a single computing device, partly on one computing device (e.g., a local computing device) and partly on another computing device (e.g., on a remote computing device, such as a server in a data center or on a cloud computing device), or entirely on a remote computing device. In the case of multiple computing devices, the computing devices may be connected to each other through any type of network that includes wired and/or wireless connections, including a local area network ("LAN") or a wide area network ("WAN"), the Internet using an Internet Service Provider, an intranet, a mobile network (e.g., a 3G network, a 4G network, or a 5G network according to Third Generation Partnership Project (3GPP) specifications), and/or the like.

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of computing device, or other programmable data processing apparatus, such that the instructions, which execute via the processor of the computer device, cause the computing device to perform operations specified in the flowchart and/or block diagram blocks. A processor may control one or more devices and/or one or more sensors described herein.

These computer program instructions may also be stored in a non-transitory computer-readable medium that, when executed, may direct a computer, other programmable data processing apparatus, or other devices to function in a particular manner, such that the instructions, when stored in the non-transitory computer-readable medium, produce an article of manufacture comprising instructions which, when executed, cause a computer to implement the operations specified in the flowchart and/or block diagram blocks. The computer program instructions may also be loaded onto a computer, other programmable instruction execution apparatus, or other device to cause a series of operations to be performed on the computer, other programmable apparatuses, or other devices to produce a computer-implemented process, such that the instructions which execute on the computer or other programmable apparatus provide processes for implementing the operations specified in the flowchart and/or block diagram blocks.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIGS. 1 to 7 disclose a beverage mixing system 10 providing for the accurate, convenient, and reliable mixing of liquid ingredients to dispense mixed drinks. While the disclosed embodiments disclose a system in which alcoholic beverages are dispensed, it is appreciated the present beverage mixing system 10 may be used in making a wide variety of drinks.

As will also be appreciated based upon the following disclosure, the beverage mixing system 10 incorporates various elements of Applicant's prior beverage monitoring system as disclosed in U.S. Patent Application Publication No. 2021/0261400, filed Feb. 21, 2020, entitled "MONITORING EQUILIBRIUM DISPENSEMENT OF A FLUID DISPENSEMENT SYSTEM TO IMPROVE QUALITY AND EFFICIENCY," which is incorporated herein by reference.

The beverage mixing system 10 includes a plurality of containers 12*a*-12*d* each including a liquid ingredient, a pumping system 14 in fluid communication with the plurality of containers 12*a*-12*d*, and a control system 16 managing the operation of the various pumps 17*a-d* to ensure the proper mixing of the various liquid ingredients to produce fresh drinks containing a mix of the liquid ingredients.

The plurality of containers 12*a-d* includes two or more liquid containers. In accordance with a disclosed embodiment, four containers are disclosed. A first container 12*a* stores a pressurized neutral alcohol, such as vodka. A second container 12*b* stores pressurized seltzer water. The third and fourth containers 12*c*, 12*d* store different liquid flavoring ingredients. While a disclosed embodiment includes liquid containers as specifically disclosed above, it is appreciated the containers and the liquid ingredients contained therein, may take a variety of forms depending upon the goals of the operator of the present beverage mixing system 10.

Fluid lines 18 extend from each of the containers 12*a-d* and are connected to a fluid manifold 20 where the liquid ingredients are ultimately combined and dispensed. The fluid manifold 20 includes a plurality of inlet ports 22*a-d* to which each of the fluid lines 18 is connected. As a result, each fluid line 18 includes an inlet end 18*a* connected to a container 12*a-d* and in fluid communication with the liquid ingredient contained within the associated container 12*a-d* and an outlet end 18*b* connected to the respective inlet port 22*a-d* of the fluid manifold 20.

In addition to the inlet ports 22*a-d*, the fluid manifold 20 includes a central body 24 where the liquid ingredients mix after being pumped from the plurality of containers 12*a-d* to the fluid manifold 20. The fluid manifold 20 also includes an outlet port 26, which is connected directly, or indirectly through an additional fluid line 27, to a dispensing tap 28, through which the mixed liquid ingredients exit for ultimate dispensing into a glass or other beverage receptacle.

As mentioned above, the beverage mixing system 10 also includes a pumping system 14. The pumping system 14 includes a plurality of pumps 17*a-d*, wherein each of the plurality of pumps 17*a-d* is connected to one of the fluid lines 18 for causing the liquid ingredients from each of the plurality of containers 12*a-d* to pass through the fluid lines 18 and into the fluid manifold 20 where the liquid ingredients are mixed and ultimately dispensed for consumption.

In accordance with a disclosed embodiment, each of the plurality of pumps 17*a-d* is a peristaltic pump positioned in-line with the respective fluid line 18. Peristaltic pumps 17*a-d* are highly accurate and reliable for generating fluid flow. Peristaltic pumps 17*a-d* employ positive displacement by sequentially acting upon a fluid within a flexible fluid line 30 fitted inside a pump casing 32. In accordance with a disclosed embodiment, the circular pump casing 32 includes a rotary drive 34 that acts upon the flexible fluid lines 30. While peristaltic pumps 17*a-d* are disclosed in accordance with one embodiment, it is appreciated other pumping mechanisms and orientations may be used without departing from the spirit of the present invention.

Operation of the plurality of pumps 17*a-d* is controlled via the control system 16. The control system 16 is linked to each of the plurality of pumps 17*a-d* and governs how and when each of the pumps 17*a-d* draw liquid ingredient from the containers for mixing within the fluid manifold 20. The control system 16 includes a plurality of control dials 36*a-d*, wherein each of the plurality of control dials 36*a-d* is associated with a pump 17*a-d* dictating the rate at which the specific pump 17*a-d* dispenses its associated liquid ingredient, and ultimately how much liquid ingredient is pumped during a single operating cycle of the beverage mixing system 10. While a dial system is disclosed in accordance with an embodiment of the present invention, the control system could be operated via a fully digital system with programmatic data that is electronically stored and displayed via a graphical user interface.

In operation, the various control dials 36*a-d* are set to specific pumping amounts. Once the control dials 36*a-d* are set as desired, the user opens the dispensing tap 28 by pulling upon the lever 40 attached thereto (that is, pulling the lever 40 in a first direction opening the tap 28). Opening of the dispensing tap 28 releases pressure within the fluid line 18, which is sensed by the control system 16, and the pumps 17*a-d* begin pumping liquid ingredients at the predetermined rates. The pumps 17*a-d* continue to operate until the lever 40 is moved in a second direction opposite the first direction to its closed position. With the lever 40 returned to its closed position, a pressure build-up is sensed by the control system 16, and the pumps 17*a-d* stop pumping liquid ingredients.

As with the dial system discussed above, the present system could be operated without the lever mechanism and would include a touch screen actuation mechanism (instead of pulling down a tap handle) to dispense the perfect pour. The associated hardware gives the bar patron the best, most consistent pour every time. Such a system would also eliminate over-pours and other undesirable results, allowing customers to realize thousands of dollars in profit every year.

The embodiment presented above provides an example of a beverage mixing system 10 with a single dispensing tap. It is, however, appreciated the beverage mixing system 10 may be assembled with a large number of dispensing taps and be capable of dispensing a wide variety of drinks based upon the liquid ingredients connected thereto. For example, and with reference to FIG. 1 a beverage mixing system 10 with four dispensing taps 28 is shown.

Figure 2:
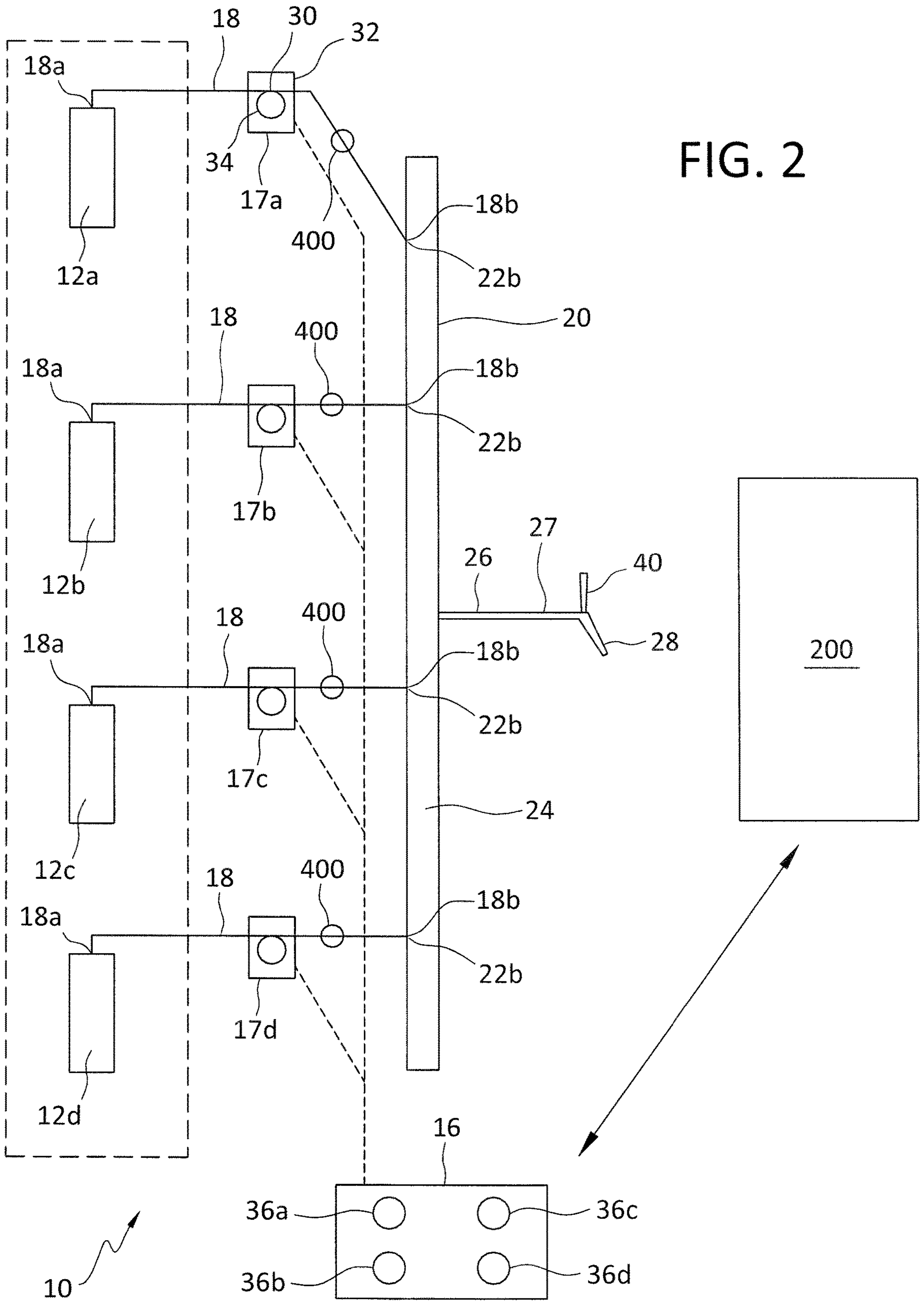
FIG. 2 is a schematic of the beverage mixing system in accordance with an embodiment having a single dispensing tap.
Figure 3:
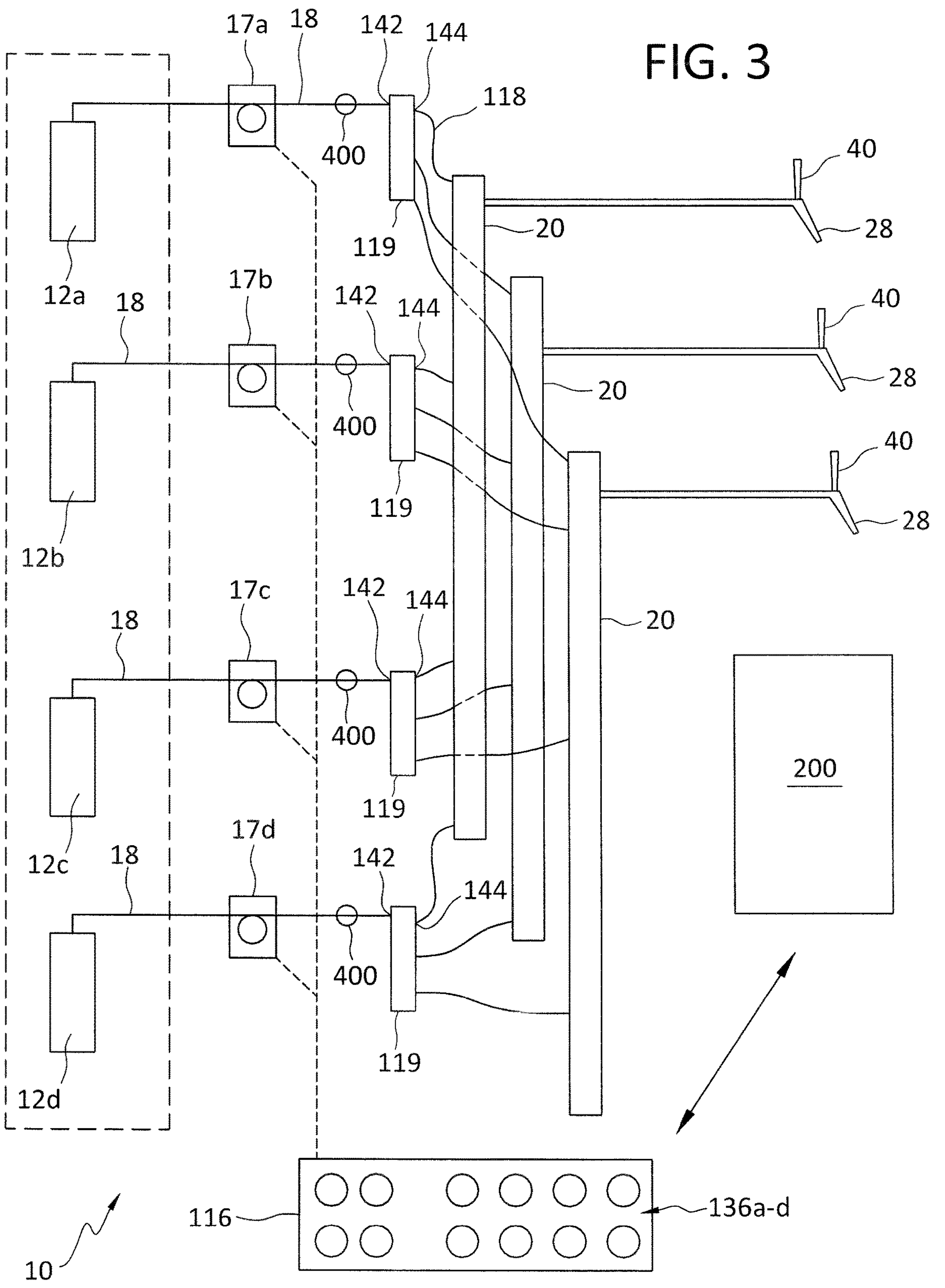
FIG. 3 is a schematic of the beverage mixing system in accordance with another embodiment having a plurality of dispensing taps.

As such, and with reference to FIG. 3 (where reference numerals similar to FIGS. 1 and 2 are used for common elements), each of the fluid lines 18 would necessarily be split to allow for the flow of liquid ingredients to manifolds 20 for each of the dispensing taps 28. This is achieved by incorporating a splitter valve 119 at the end of each of the fluid lines 18 at a position after the pump 17*a-d*. Each of the splitter valves 119 will include a single input port 142 and a number of outlet ports 144 attached to secondary fluid lines 118 to accommodate the number of the dispensing taps 28 to which it is to be attached. In such a scenario, the control system 116 will include a series of control dials 136*a-d* for each of the dispensing taps 28.

The operation of the multiple dispensing tap system is very similar to that disclosed above with reference to the single dispensing tap system of FIG. 2. In operation, the various control dials 136*a-d* are set to specific pumping amounts. Once the control dials 136*a-d* are set as desired, the user opens one of the dispensing taps 28 by pulling upon the lever 40 attached thereto (that is, pulling the lever 40 in a first direction opening the tap 28). Opening of the dispensing tap 28 releases pressure within the fluid lines 18, 118 which is sensed by the control system 116, and the pumps 17*a-d* begin pumping liquid ingredients at the predetermined rates. The pumps 17*a-d* continue to operate until the lever 40 is moved in a second direction opposite the first direction to its closed position. With the lever 40 returned to its closed position, a pressure build-up is sensed by the control system 116, and the pumps 17*a-d* stop pumping liquid ingredients.

As mentioned above, the beverage mixing system 10 integrates various elements of Applicant's prior beverage monitoring system 200 as disclosed in U.S. Patent Application Publication No. 2021/0261400, filed Feb. 21, 2020, entitled "MONITORING EQUILIBRIUM DISPENSEMENT OF A FLUID DISPENSEMENT SYSTEM TO IMPROVE QUALITY AND EFFICIENCY," which is incorporated herein by reference. In accordance with a disclosed embodiment, and referring to FIGS. 4 to 7, the beverage monitoring system 200 includes a gateway 210 installed at the establishment location, and its data connections with the dispensing tap(s) 28 (or beverage dispenser), sensor assemblies 300, flow sensors 400 (see FIGS. 5A, 5B, 6A, 6B, and 6C), and environmental sensors 500 (see FIGS. 5A & 5B), respectively. In addition, and as commonly employed at restaurants, bars, breweries, and other establishments where mixed beverages are served, a point of sale system 150 is provided whose data is integrated in a separate processing system. In addition to the flow sensors 400 and environmental sensors 500, various other sensors, including, but not limited to pressure sensors 600, carbon dioxide sensors 700, and/or color sensors 800, may be integrated with the beverage monitoring system 200 to enhance the operation of the beverage mixing system 10. The gateway 210 is connected via a network to off-site resources (e.g., server devices) 214. The disclosed embodiment implements a standard interface which is used to integrate any analog or digital sensor into the data produced by the gateway for cloud consumption.

As will be appreciated based upon the following disclosure, the gateway 210, the sensor assemblies 300, flow sensors 400, environmental sensors 500 (including the carbon dioxide sensors 700), pressure sensors 600, and/or color sensors 800 work in conjunction to gather, process, and dispense information regarding the operation of the beverage mixing system 10.

Figure 7:
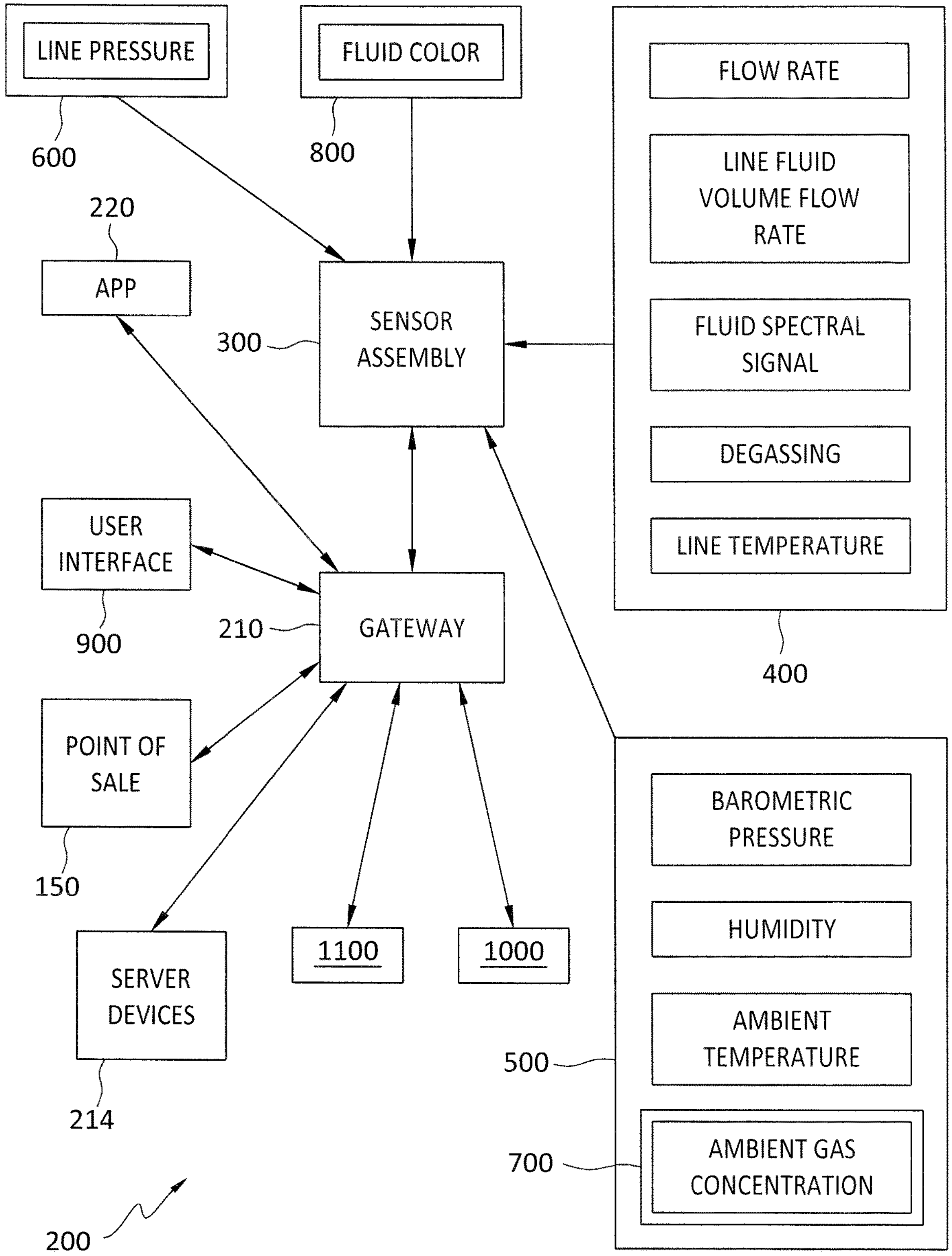
FIG. 7 is a schematic of the beverage monitoring system.

Referring to FIG. 7, the data include real-time readings relating to characteristics of the beverage flowing through the fluid lines 18, including, but not limited to, the line temperature, the line pressure, the fluid color, the fluid spectral signature, the degassing of the fluid, and the flow rate of the fluid. The data also include environmental readings relating to the environment associated with the beverage mixing system 10, including, but not limited to, barometric pressure, humidity, ambient temperature, and ambient gas concentrations. The data further include sales information. As will be appreciated based upon the following disclosure, this data is processed by the gateway 210 and, optionally, off-site resources 214 to generate information that is presented to beverage system operators via various interfaces 900 in a manner allowing the beverage system operators to optimize the operation of their beverage mixing system 10.

For example, the present beverage monitoring system 200, via various interfaces 900, provides real-time container levels so that beverage system operators may monitor when they are beginning to run low on a particular beverage and can move the replacement container into position. Beverage system operators also have the ability to reference real-time temperatures for any of their fluid lines 18 to determine if they are experiencing sub-optimal temperatures.

The Daily, Weekly, and Monthly reports provided in accordance with the present beverage monitoring system 200 all include a System Health section that breaks down the percentage of pours for each fluid line 18 and classifies Low, Normal, or High conditions for temperature and pressure. Beverage system operators are able to configure their operating thresholds for temperature on a per-line basis and indicate whether they want stricter or more lenient thresholds for flagging pours with temperature issues. Depending on what issues they observe in the beverage system Health Section of the reports, operators then have the ability to take action on those issues to attempt to mitigate the problem. Daily reports generated by the present beverage monitoring system 200 provide an hourly breakdown of pour data and include an overlay which indicates what percentage of the pours had underlying quality-related issues—allowing beverage system operators to identify whether the issue persisted throughout the day or over a brief period. When taking actions steps, the present beverage monitoring system 200 encourages the beverage system operators to leverage these reports and then utilize the application 220 of the present beverage monitoring system 200 when making adjustments to validate the conditions that their beverage mixing system 10 is operating under.

In addition, the systems described herein may generate a report that includes information related to a result of analyzing data, which identifies a source of an issue of a flow of fluid, forecasts for fluid dispensing, compares net profits, and/or the like. For specific examples, the reports may identify per-container efficiency or other per-container metrics, an expected remaining life for a container, that a particular container and/or fluid line 18 is experiencing a leak, and/or the like.

With the foregoing in mind, and considering the following detailed disclosures, the present beverage monitoring system 200 provides the tools and the data to allow beverage system operators to make informed business decisions. The reporting and consulting style of the present beverage monitoring system 200 is aimed at providing the beverage system operator with as much information as possible so that they can confidently navigate their issues. It is appreciated the present beverage monitoring system 200 may be integrated with additional sensors and control systems to automatically rectify issues such as the temperature of the cooler in which the containers 12*a-d* are stored or the pressure within the fluid line 18. In addition, and as commonly employed at restaurants, bars, breweries, and other establishments where a mixed beverages are served a point of sale system 150 is provided whose data is integrated in a processing system separate from that of the beverage monitoring system 200.

Figure 4A:
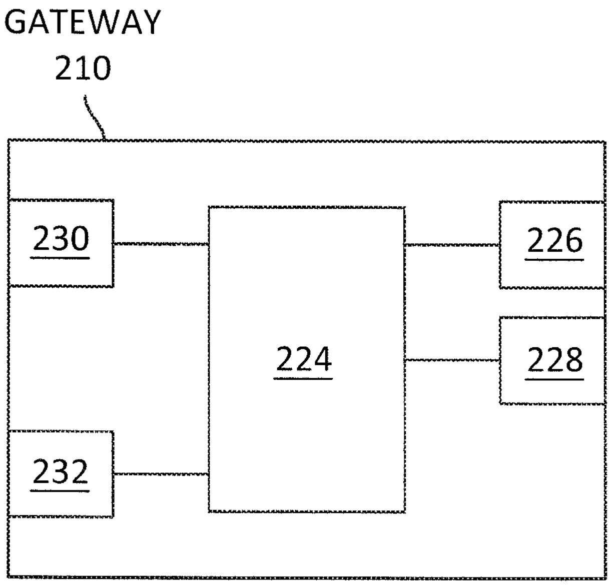
FIG. 4A is a functional diagram of an example local controller (i.e., gateway) according to some embodiments of the present disclosure.
Figure 4B:
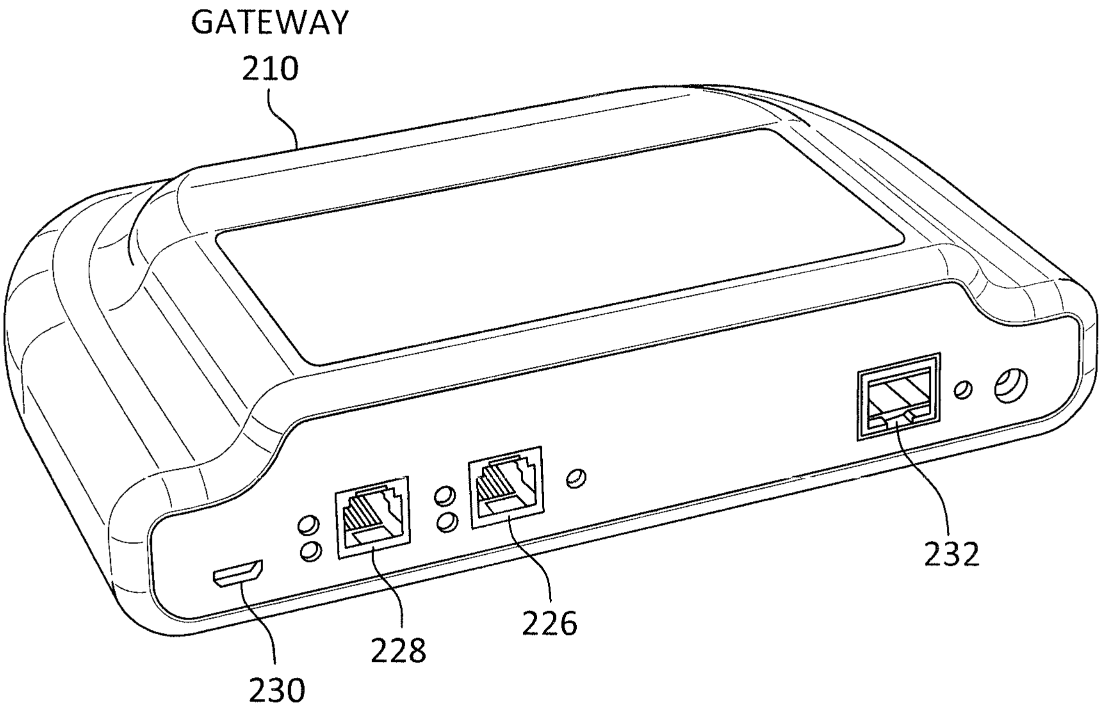
FIG. 4B is an external view of the example gateway of FIG. 4A according to some embodiments of the present disclosure.

FIG. 4A depicts a functional diagram of an example local controller, i.e., gateway 210, according to some embodiments of the present disclosure. FIGS. 4A and 4B depict the gateway 210 of the beverage monitoring system 200 described with respect to FIG. 7. In some embodiments, the gateway 210 is used to monitor and collect environmental and flow metrics for a beverage being dispensed from the respective dispensing taps 28, serve as a router between various devices, and serve as a gateway between the devices located on-site at the establishment location and off-site, e.g., the off-site resources 214. The gateway 210 is connected to the beverage mixing system 10. The gateway 210 includes a processor 224, a network interface 226 connected via connection to dispensing taps 28, a network interface

228 connected via connection to sensor assemblies 300, an interface 230 for serial communication, and an Ethernet network interface 232.

The gateway network interfaces 226, 228, and 232 are controlled and signaled separately to reduce packet latency. The gateway 210 serves as a router between the network interfaces 226, 228, 232, 234. The gateway 210 may also implement alternative communications interfaces such as cellular network modems to provide connectivity where wired Ethernet or wireless Ethernet (WiFi) is unavailable or otherwise undesirable.

Figure 5A:
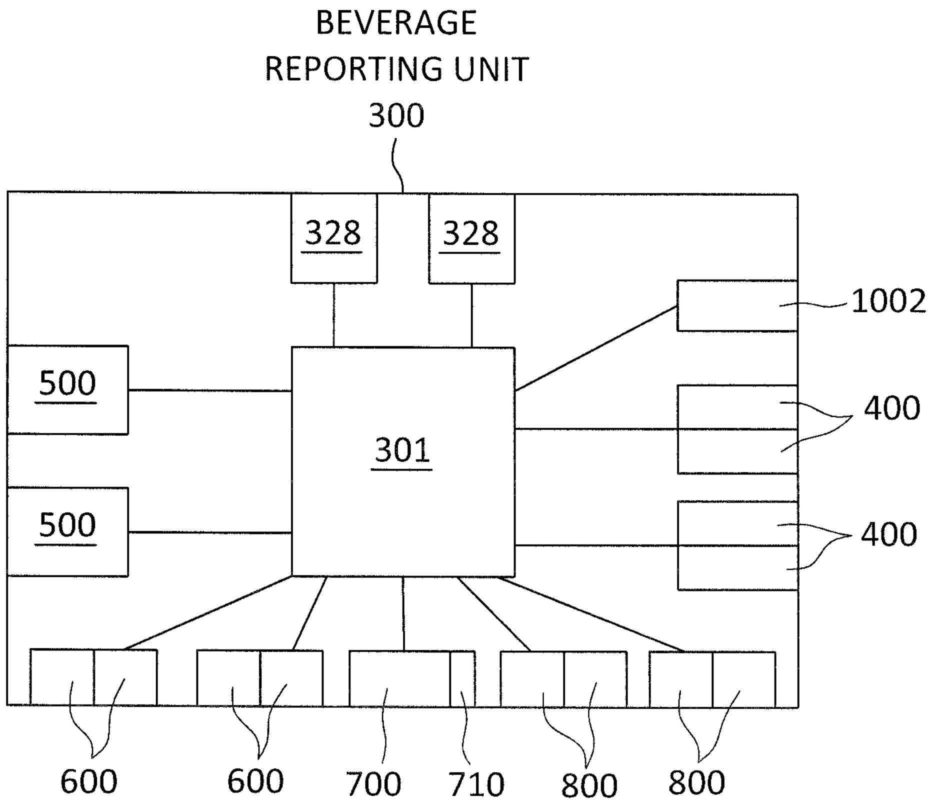
FIG. 5A is a functional diagram of an example sensor assembly (e.g., a beverage reporting unit (BRU)) according to some embodiments of the present disclosure.
Figure 5B:
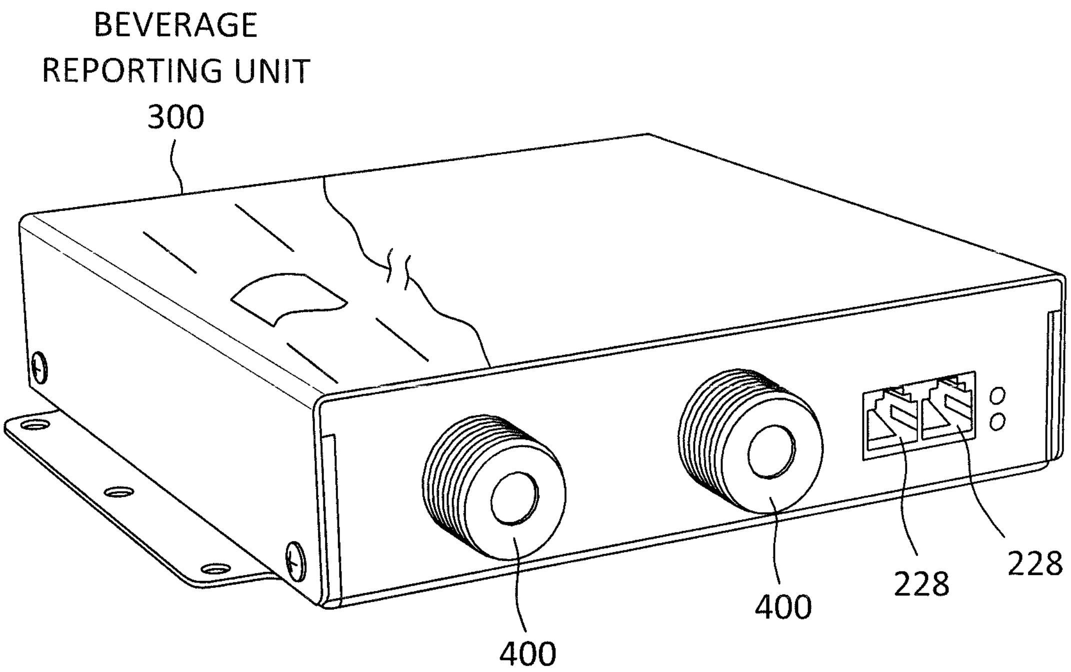
FIG. 5B is an external view of the example sensor assembly of FIG. 5A according to some embodiments of the present disclosure.

FIG. 5A depicts a functional diagram of an example sensor assembly 300 (e.g., a beverage reporting unit (BRU)) according to some embodiments of the present disclosure. For example, FIGS. 5A and 5B depict a sensor assembly 300 of the beverage monitoring system 200. The sensor assembly 300 may house sensors and may provide locally collected data to the gateway 210 for further processing. The sensor assembly 300 includes a processor 301, sensor network interfaces 328 (e.g., one for connecting upstream towards the gateway 210, and one for connecting downstream towards the next daisy-chained sensor assembly 300, if present), one or more flow sensors 400, one or more environmental sensors 500, one or more pressure sensors 600, and/or one or more color sensors 800. Briefly, and as will be discussed in more detail below, the flow sensors 400 provide data relating to pressure, temperature, and fluid flow within the fluid lines 18. The environmental sensors 500 provide data relating to the environmental conditions within the cooler in which the containers 12*a-d* containing the liquid ingredients are stored, including, but not limited to, barometric pressure, humidity, ambient temperature, as well as oxygen, nitrogen, carbon dioxide, or other ambient gas concentrations. The pressure sensors 600 provide direct real-time measurements of pressure within the fluid lines 18, and/or color sensors 800 provide optical information regarding color characteristics of the beverage from which operational information may be ascertained. The collected data is applied to provide operators with critical insights regarding the operation of their beverage system.

The embodiment disclosed with reference to FIG. 5A depicts four flow sensors 400, two environmental sensors 500, four pressure sensors 600, one carbon dioxide sensor 700, and four color sensors 800, but any suitable number of sensors may be used depending on the number of fluid lines 18 and coolers to be measured. In accordance with a disclosed embodiment, the number of flow sensors 400, pressure sensors 600, and color sensors 800 corresponds to the number of fluid lines 18 to be distinctly measured. FIG. 5B depicts an external view of the example sensor assembly of FIG. 5A according to some embodiments of the present disclosure.

Figure 6A:
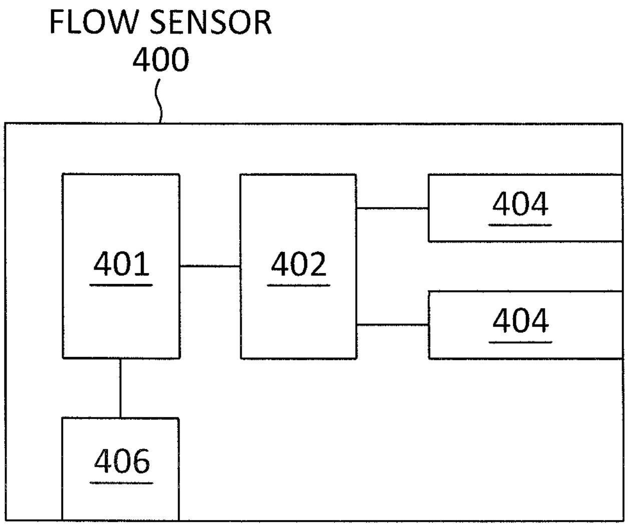
FIG. 6A a functional diagram of an example flow sensor according to some embodiments of the present disclosure.

FIG. 6A depicts a functional diagram of an example flow sensor according to some embodiments of the present disclosure. The flow sensors 400 are integrated into the respective fluid lines 18. For example, FIG. 6A depicts a diagram of a flow sensor 400. The flow sensor 400 includes a processor 401, an ultrasonic front-end processor 402, two ultrasonic transducers 404, and a temperature sensor 406. The ultrasonic front-end processor 402 communicates with processor 401 via a flow pulse interface, or in accordance with alternative embodiments, via serial data communication, and/or pulse width modulation (PWM) or any combination of these methods. PWM of flow rate can potentially send flow data with higher resolution than a simple pulse flow interface and with lower latency. A serial data interface can potentially send flow and other measurement data much faster than a simple pulse flow or PWM interface and with lower latency than either.

As described below in more detail, in an example embodiment, flow sensor 400 includes two ultrasonic transducers 404 and uses a time of flight mechanism to measure the flow rate of the beverage being dispensed. The ultrasonic front-end processor 402 causes an ultrasonic signal to be sent through the fluid 420, which travels through a channel 450, at a known nominal speed along a signal path of known length 440 in one direction, from one ultrasonic transducer 404 to the other ultrasonic transducer 404, and then to be sent back again in the opposite direction. The difference between the signal travel time in each direction may be directly correlated to fluid flow speed because the measured speed of that signal is increased or decreased from its nominal speed by that flow speed, as that signal travels with or against the flow, respectively. More specifically, the gateway 210, via the sensor 400, detects leading and trailing edges, accumulates data between them, including flow volume and distribution statistics for the several variables sampled, and sends those to the off-site resources 214 (for example, cloud) when the pour concludes, i.e., the trailing edge is detected. Additionally, as the "zero flow" signal drifts over time, when a pour is NOT occurring, a moving average is accumulated that reflects the zero flow at any given time, which is used to adjust flow volumes downstream. It is, however, appreciated the sensing and calculations may take place in other parts of the system. Certain example embodiments may incorporate a correction for the effect of different temperatures, different alcohol concentrations, or different compositions (as characterized by spectral signatures) on the nominal speed of sound in the fluid.

In particular, the calculation of flow speed is performed in the following manner. The ultrasonic front-end processor 402 causes an ultrasonic signal to be sent, at a known nominal speed along a signal path of known length 440, from a first ultrasonic transducer 404*a* to a second ultrasonic transducer 404*b* through the fluid 420 traveling through a channel 450. The ultrasonic front-end processor 402 causes a signal to be sent, at a known nominal speed along a signal path of known length 440, from the second ultrasonic transducer 404*b* to the first ultrasonic transducer 404*a* through the fluid 420 traveling through the channel 450. The difference between the signal travel time in each direction is directly correlated to an initial determination of fluid flow speed because the measured speed of that signal is increased or decreased from its nominal speed by that flow speed, as that signal travels with or against the flow, respectively.

The initial determination of fluid flow is then adjusted based upon sensed and known characteristics of the fluid, such as, temperatures, different alcohol concentrations, or different compositions (as characterized by spectral signatures), to arrive at a sensed fluid flow speed (units length per time). The volume flow rate (units length^3 per time) is then calculated by multiplying the sensed fluid flow speed by the nominal cross-sectional area of the fluid flow channel 450 (units length^2).

Figure 6B:
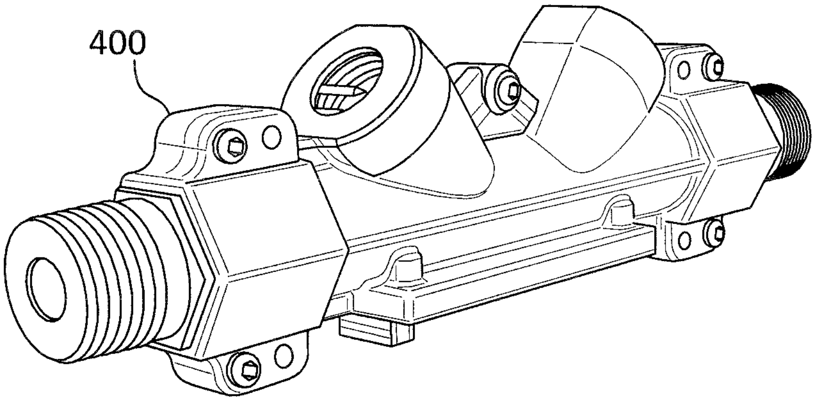
FIG. 6B is an external view of the example flow sensor of FIG. 6A according to some embodiments of the present disclosure.
Figure 6C:
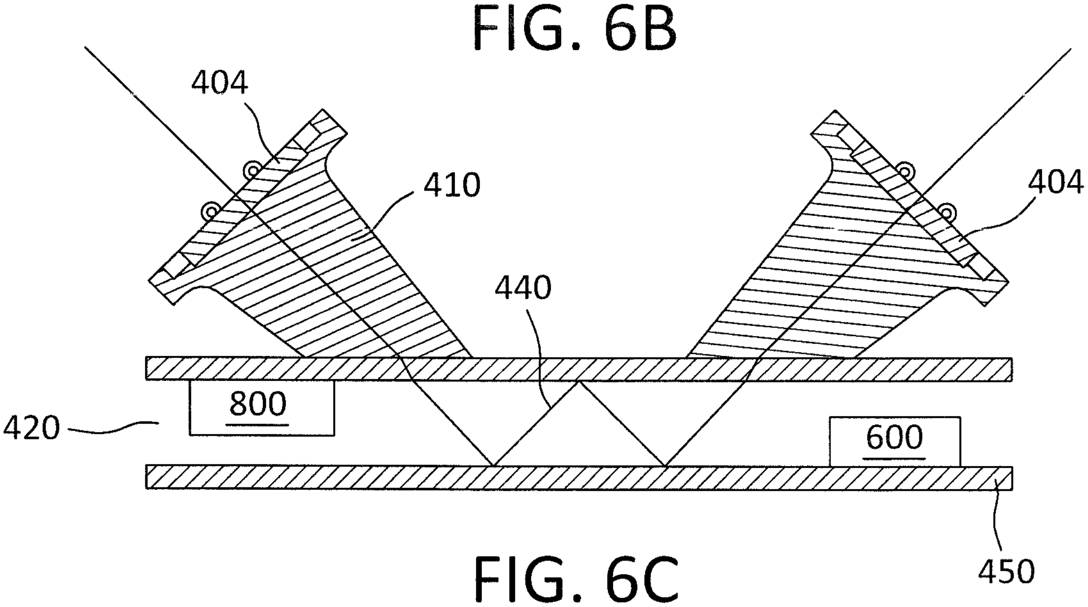
FIG. 6C is a cutaway view of the example flow sensor of FIG. 6B according to some embodiments of the present disclosure.

FIG. 6B illustrates an external view of the example flow sensor 400 of FIG. 6A according to some embodiments of the present disclosure. FIG. 6C illustrates a cutaway view of the example flow sensor 400 of FIG. 6B according to some embodiments of the present disclosure, to highlight the ultrasonic signal path. As illustrated in FIG. 6C, the first ultrasonic transducer 404 and the second ultrasonic transducer 404 are arranged relative to each other to establish a signal path between them through the monitored fluid, considering the material properties the components traversed by the signal path (i.e., transducer mounts 410, fluid flow channel 450 wall, and monitored fluid 420), and the first ultrasonic transducer 404 and the second ultrasonic transducer 404 may be piezo transducers operating in a range from 100 kHz to 5 MHz. In certain embodiments, the sensor may be placed inside the dispensing tap 28 or dispensing unit itself.

The ultrasonic transducers 404 of the present disclosure, in addition to providing information regarding measured flow rate as discussed above, also provide baseline signal quality metrics under normal operating conditions. For example, if the channel 450 is full or substantially full of fluid 420, the transducer provides a baseline signal strength. When that signal strength decreases, such a decrease can be used to determine the amount of air or other gases in the fluid lines 18, or other deviations from a fully-wetted channel, e.g., biofilm.

By way of example, the baseline signal quality metrics are applied in a rule-based evaluation system that runs each time a pour (a population of samples combined with descriptive statistics) or heartbeat (a signal regularly generated by the system providing an indication of signal quality, as well as other functionalities discussed below) is received. For the purposes of this disclosure, the evaluation system is described with respect to each time a pour is received.

Each time a pour is received, the following process is followed:

(1) the type (i.e., pour or heartbeat) and ID of the event is sent into a queue for asynchronous processing (so as to prevent longer-running rules from delaying processing);

(2) the message queued in Step 1 is received, and several data items are retrieved:
  - the window: this pour along with some number (0 or more) of the most recent for this sensor; and
  - the variables: specific numerical values, e.g., number of samples, average sample volume, standard deviation of sample signal strength, z score of this pour's mean sample volume compared with that of those in the defined window;

(3) the data from Step 2 is evaluated based on the saved rule; and (4) the outcome from Step 3, either true or false, is used to initiate actions based on the saved rule (e.g., set a pour condition, archive a pour).

For example, where the standard deviation of sample signal strength is between 50 and 75, the "low pressure" condition exists and is set on the pour. This condition is then used in downstream analyses when characterizing waste.

The baseline signal quality metrics are used to initiate notice to bar personnel that the beverage mixing system 10 may have become unbalanced, the attached container may be empty, or there may be a leak in the fluid lines 18 or other issue with the supply gases. For example, the beverage monitoring system 200 may perform this determination and may output a notification to the application 220 of the beverage mixing system 10. Based on other sensor data points, the beverage monitoring system 200 may determine the origin of the unbalanced condition. For example, if the detected temperature and flow rate are to specifications and detected ambient pressure in the cabinet is low, then the beverage mixing system 10 pressurization may have to be increased. For another example, if the detected temperature is higher than specification, then the environmental control (e.g., thermostat) may have to be used to reduce the temperature and the beverage mixing system 10 pressurization may have to be decreased until the temperature reaches specification. The present disclosure also distinguishes between a decrease in signal strength or quality (e.g., indicating air bubbles) and complete loss of signal or degradation of a signal below a predetermined threshold (e.g., indicating that a fluid lines 18 is empty).

In certain embodiments, the temperature sensor 406 is a semiconductor temperature sensor, thermocouple, a non-contact infrared sensor, or a similar device fixed to the inside or the outside of the sensor pipe using glue or any other suitable attachment mechanism. The data monitored by the temperature sensor 406 may be collected at the same time as the flow data from the flow sensor 400, and may be collected first by the sensor assembly 300 and then forwarded to the gateway 210. Those data may be then reported to off-site components for storage and further analysis.

In addition to the use of the heartbeat in conjunction with signal quality, the heartbeat may be used to monitor the status of the fluid lines to provide operational information on a periodic basis, whether beverages are being poured or not. For example, the heartbeat may be used to identify increases/decreases in the cooler temperature (by providing indications as to the temperature within the fluid lines) or to identify potential leaks (by identifying continued flow with the fluid lines without identifying a trailing edge to the flow).

Additionally, and as discussed herein in greater detail, the flow sensor 400 may incorporate other sensing mechanisms, for example, pressure sensors 600 and color sensors 800. The flow sensor may further include any combination of an illumination source, a light sensor, multi-channel spectral sensor, dissolved gas concentration sensors, and/or laser to monitor various aspects of the beverage color and/or beverage spectral signature or even to identify air or other gases passing through the fluid lines 18.

In accordance with a disclosed embodiment, the sensor assembly 300 also includes one or more environmental sensors 500. The environmental sensors 500 measure and monitor cooler barometric pressure, humidity, and/or ambient temperature, as well as oxygen, nitrogen, carbon dioxide, and/or other ambient gas concentrations (e.g., to promote employee safety and prevent asphyxiation in the event of a major gas leak). Based on barometric pressure, the beverage monitoring system 200 calculates the gas pressurization adjustments necessary to properly balance the beverage mixing system 10 and maintain the desired amount of dissolved gases in the beverage, determines an amount of adjustment in one or more mechanical components needed to cause the gas pressurization adjustments, and triggers actuation of one or more mechanical components to cause the gas pressurization adjustments (e.g., by sending an instruction to the one or more mechanical components).

As discussed above, the beverage monitoring system 200 may include pressure sensor(s) 600, carbon dioxide sensor (s) 700, and/or color sensor(s) 800. These sensors are discussed herein in greater detail.

In accordance with a disclosed embodiment, the pressure sensor(s) 600 is a commonly available pressure transducer that is integrated into the fluid lines 18. In accordance with a disclosed embodiment, the pressure transducer 600 is integrated into the flow sensor 400, although it is appreciated pressure transducers 600 could be positioned at various locations beverage monitoring system 200. The integration of the pressure transducer 600 enables the measurement of real-time data pertaining to force applied to a specific surface (for example, in pounds per square inch (PSI) units) of an individual fluid line 18. The ability to monitor the PSI helps assist customers in diagnosing and resolving pressure-related issues with the beverage mixing system 10. Furthermore, the measurement of real-time data pertaining to the PSI of an individual fluid line 18 is utilized in signal quality metric assessments.

The recommendation of specific actions being taken based upon measurement of real-time data pertaining to the PSI of an individual fluid lines 18 depends on the type of gas system—whether it is strictly carbon dioxide versus mixed-gas.

Carbon dioxide sensor(s) 700 and alarms 710 are also provided. It is appreciated carbon dioxide leaks result in financial losses and safety problems. The present beverage monitoring system 200 addresses these issues by integrating carbon dioxide sensor(s) 700 and alarms 710. The carbon dioxide sensor(s) 700 are commonly positioned in a cooler in which the containers and carbon dioxide source are maintained.

Photometers and/or spectrophotometers may be used as a color sensor 800 in accordance with a disclosed embodiment of the present beverage monitoring system 200. In accordance with a disclosed embodiment, the color sensor 800 is integrated into the flow sensor 400, although it is appreciated color sensors 800 could be positioned at various locations throughout the beverage monitoring system 200.

The addition of a color sensor(s) 800 provides additional insight into the optimal operation of the beverage mixing system 10. For example, the information extracted from the color sensor(s) 800 allows for the determination of one or more of the following: the specific beverage traveling through the fluid lines 18, the identification of beverage characteristics (e.g., freshness, level of oxidation), and/or fluid line characteristics (e.g., cleanliness).

The data extracted from the color sensor(s) 800 may also be combined with other sensors or data gathered by way of the present beverage monitoring system 200 to provide more robust handling tailored to specific beverages.

The beverage monitoring system 200 is further enhanced by integrating certain features into the cooler. For example, the beverage monitoring system 200 includes a cooler control and monitoring assembly 1000 that specifically monitors the cooler fans, monitors humidity within the cooler, monitors barometric pressure within the cooler, etc. By providing a cooler control and monitoring assembly 1000 that specifically monitors the cooler fans, the present beverage monitoring system 200 is able to maintain a service history, monitor ongoing system health, identify trends, and provide customer feedback on the general operation and performance of their cooler. Integration of the cooler control and monitoring assembly 1000 with the beverage monitoring system 200 provides for the ability to determine if a cooling cycle is deviating from the norm—potentially indicating an issue or abnormality in the beverage mixing system 10.

As mentioned above, the cooler control and monitoring assembly 1000 also includes sensors 1002 for monitoring barometric pressure within the cooler. Measurements relating to barometric pressure on the BRU are applied to determine if there is deviation in the operation of the cooler. Measurements relating to barometric pressure on the BRU are also applied to alert beverage system operators if their cooler is non-operational, is overdue for regular maintenance, or needs maintenance to rectify an issue, and can be used to further tune system balancing in consideration of line length and diameter.

In accordance with a disclosed embodiment, the information generated by the flow sensors 400, environmental sensors 500, pressure sensors 600, carbon dioxide sensors 700, and color sensors 800, as well as beverage dispensers, and the cooler control and monitoring assembly 1000, are combined and processed to provide insights into the operation of the beverage mixing system 10, and ultimately allow one to optimize operation.

As discussed above, the flow sensors 400 provide specific information regarding flow rate, fluid temperatures, signal quality metrics, changes in the flowing beverage (e.g., a container change), line cleanliness compared with a baseline, the presence of beer stones, the gases present, fluid density, alcohol percentages etc. The environmental sensors 500 provide specific information regarding cooler barometric pressure, humidity, ambient temperature, as well as oxygen, nitrogen, carbon dioxide, or other ambient gas concentrations. The beverage dispensing taps provide specific information regarding pours. The point-of-sale system provides specific information regarding sales.

With this information in hand, the beverage monitoring system 200 determines a wide range of operator parameters and whether the beverage mixing system 10 is operating properly.

Other examples of controls incorporated into sensors are possible. For example, a temperature sensor 406 that measures the temperature of the liquid in the fluid line 18, may incorporate the ability to control the temperature of the cooler in which the container supplying the flowing fluid is stored, or have another control mechanism to adjust the temperature of the liquid in the fluid line 18, e.g., glycol. Including controllers in conjunction with one or more of the sensors may provide for an autonomously balanced beverage mixing system 10 based on system parameters (e.g., line length, line drop, beverage dispensed, other factors discussed in this specification), environmental or other conditions identified by the sensors (e.g., temperature changes, changes in weather patterns creating barometric pressure variations contributing to flow anomalies) that may detect abnormalities or other changes and may make adjustments to correct or improve the operating conditions of the beverage mixing system 10 automatically and autonomously.

The gateway 210 may function as a protocol converter for sensor network data and may be connected via network to off-site resources 214. The gateway 210 may query one or more of the sensor assemblies 300 ("pull"), or optionally one or more of the sensor assemblies 300 may report directly to the gateway 210 ("push"). The sensor assembly 300 may provide the data from its flow sensors and environmental sensors. The gateway 210 may then consolidate and process the data using algorithms to analyze the data, including to find the start and stop of flow (e.g., the start of flow may be determined when the flow exceeds a threshold flow rate and stop of flow may be determined when the flow is below the threshold flow rate). The gateway 210 may submit this data to off-site resources 214 for retention and further processing, including correlating the flow and environmental data with point-of-sale system data and characterizing the flow (e.g., as beverage dispensement, leakage, system cleaning) based on whether the flow satisfies pre-determined threshold flow rates, based on sensor data and other information (e.g., bar-provided business hours and scheduled/activated cleaning procedures). Thus, the flow of data contemplated by certain embodiments may involve the sensors monitoring and measuring the flow of the beer and associated environmental conditions as it flows to the dispensing tap 28 to be poured. Those sensors may provide that data to the sensor assembly 300. The sensor assembly 300 may report that data to the gateway 210, and the gateway 210 may provide that data to off-site resources 214 via the network.

The gateway 210 may poll (e.g., periodically, according to a schedule, or in a continuous manner) the to request data and may receive packets from the sensor assemblies 300 representing flow (e.g., flow in milliliters since the last packet) and environmental data. Using this data, the gateway 210 may perform processing to determine if a fluid flow is occurring (e.g., different types of flows, such as a pour, a leak, line cleaning, and/or the like may be identified based on whether the flow rate satisfies one or more pre-determined thresholds). The gateway 210 may constantly monitor the flow (e.g., in a streaming manner). The gateway 210 may run a derivative function over the flow rate. When the gateway 210 detects a sharp rise relative to some threshold (e.g., predetermined or dynamically determined threshold), it may start accumulating data until it detects the end of the pour. In this way, the accumulation of relevant data may be sent to off-site resources 214, e.g., cloud resources for storage and/or further analysis. The accumulated data may be stored in the gateway 210, in some embodiments.

In accordance with a disclosed embodiment, and considering the beverage monitoring system 200 includes a gateway 210 with data connections with the dispensing taps 28, point of sale systems 150, and flow sensors 400, the beverage monitoring system 200 is able to match pours with sales to provide insight to efficient operation. It should, however, be appreciated that the gateway 210 only has a data connection with the flow sensors 400 and "the cloud" 116 and has no connection at all to the, i.e., "smart taps" (such things are generally not installed anyway); and POS integration is done downstream, i.e., "in the cloud", via a different channel with no knowledge by the gateway 210.

This is achieved using active, i.e., not archived, pours and sales, each with an associated beverage, volume, and timestamp. It should be appreciated that pour archival is a process by which pours are flagged for exclusion a) automatically based on numerical criteria, e.g., sample count below a threshold, sample flow volume standard deviation above a certain threshold, negative total volume, or b) manually based on out of band knowledge, e.g., sensor problem, special event. Sale archival is a process by which sales are manually flagged for exclusion based on out of band knowledge, e.g., sensor offline. In each case, archival is used to ensure that inaccurate data and data that is incorrectly unbalanced (as opposed to data that is correctly unbalanced, e.g., in the case of poor POS usage) is excluded and does not reduce the accuracy of related reports.

The procedure functions in the following manner.

Step 1. For a given integration job (i.e., a batch of POS data defined by a timestamp range and location), a time series of data is produced for each beverage and business day. The time series of data consists of commingled pours and sales, ordered by timestamp. For the purposes of "business day" the concept of "rotation" which refers to the number of hours "today" extends into "tomorrow" for the purposes of reporting, e.g., data through 2 AM tomorrow (i.e., a 2 hour "rotation") will be counted in the data for "today," is utilized.

Step 2. For each time series produced in Step 1, the pours and sales are related by: matching pour to sale (this accounts for 1:1 ratio for sale:pour)—for each sale match the closest (i.e., with respect to time and volume, with separate thresholds) unmatched pour (if present) (step 2.1); match pour to sales (this accounts for m:1 ratio for sales:pour, e.g., one 32 oz pour for two 16 oz sales)—within an order, aggregate sales into a single "sale" and repeat the process from Step 2.1 (respecting and matches already made)(step 2.2); match top-offs (this accounts for relatively small pours used to "complete" large pours)—for matched pours, match unmatched small pours occurring within a parameterized time and for the same line as the base matched pour (step 2.3).

Step 3. The match groups (graph theory "components") are extracted from related pours and sales in Step 2.

Step 4. The match groups from Step 3 are saved to the database for use in analysis.

It is contemplated the above procedure may be further optimized by considering 1:m ratio for sale:pours for handling incremental pours that are not top-offs (Step 2.3); relations between pours and sales that may have been mis-connected (pours) or mis-rung (sales); and applying machine learning to tune matching algorithm based on observed location-specific behavior with respect to pours and sales, e.g., tab closures (and sale timestamps) at shift end, 1:m and m:1 sale:pour practices.

Diagnostics can also be run on the data on the gateway 210 or on the off-site resource. For example, the beverage monitoring system 200 of certain embodiments may remotely diagnose potential problems (e.g., system over-pressurization, cooler temperature anomalies) without the need for personnel at the enterprise location to make a service call, e.g., the beverage monitoring system 200 may remotely diagnose that beverages are being wasted, that a cooler temperature is not being maintained, and/or the like. The gathered data is also used to monitor pricing, usage, trends, regional preferences, etc.

With the wide variety of data sources and information generated based upon the components of the present beverage monitoring system 200, a robust user interface is provided offering end beverage system operators high-level overviews, as well as highly detailed views.

The embodiments disclosed above provide for a variety of parameters that may be measured, used to extrapolate data, presented to operators, and/or used for other purposes in association with the operation of the beverage mixing system 10. The monitored parameters, extrapolated data, and operational insights may be used in various combinations that are specifically adapted to meet the needs of the operator of the system. The information and controls offered by the present beverage monitoring system 200 provide a wide variety of business advantages, including, but not limited to, tax benefits based upon the quantification of waste, improved efficiency, optimized cleanliness based upon feedback systems, enhanced monitoring of container use and inventory, identification of potential theft due to "on the house" drinks.

One of the many benefits the beverage monitoring system 200 provides is that it is able to digitally keep track of when line cleanings occurred, how long they occurred, who performed them, and how effective they were. There are several different types of cleanings, from a short rinse to a long-soak and then subsequent recirculation of the cleaning solution through the beverage mixing system 10. Customers are able to specify which types of cleanings they are performing so that the information can be properly categorize and understood as to what to expect in terms of flow data.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A beverage mixing system providing for accurate, convenient, and reliable mixing of liquid ingredients to dispense drinks, comprising:

a first container storing a neutral alcohol;

a second container storing seltzer water;

a third container storing a liquid flavoring ingredient;

a fluid manifold where liquid ingredients from the first, second, and third containers are combined and dispensed, the fluid manifold includes a plurality of inlet ports and a central body where the liquid ingredients mix after being pumped from the first, second, and third containers to the fluid manifold, the fluid manifold further including an outlet port connected to a dispensing tap, through which mixed liquid ingredients exit for ultimate dispensing into a glass or other beverage receptacle;

a first fluid line including an inlet end connected to the first container and an outlet end connected to a first inlet port of the fluid manifold, and a first peristaltic pump positioned in-line with the first fluid line to control fluid flowing therethrough;

a second fluid line including an inlet end connected to the second container and an outlet end connected to a second inlet port of the fluid manifold, and a second peristaltic pump positioned in-line with the second fluid line to control fluid flowing therethrough;

a third fluid line including an inlet end connected to the third container and an outlet end connected to a third inlet port of the fluid manifold, and a third peristaltic pump positioned in-line with the third fluid line to control fluid flowing therethrough;

each of the first fluid line, the second fluid line and the third fluid line including a flow sensor positioned between the respective first peristaltic pump, the second peristaltic pump, and the third peristaltic pump and the first inlet port, the second inlet port, and the third inlet port, the flow sensors providing real-time readings relating to characteristics of the fluid flowing through the first fluid line, the second fluid line and the third fluid line including line temperature, line pressure, fluid color, fluid spectral signature, degassing of the fluid, or flow rate of the fluid; and a control system managing operation of the first peristaltic pump, the second peristaltic pump, and the third peristaltic pump to ensure proper mixing of the liquid ingredients to produce fresh drinks containing a mix of the liquid ingredients, wherein the control system is linked to each of the plurality of pumps governing how and when each of the pumps draws liquid from the containers for mixing within the fluid manifold and the control system is linked to the flow sensors provided along the first fluid line, the second fluid line and the third fluid line.

2. The beverage mixing system according to claim 1, wherein the control system includes a plurality of control dials.

3. The beverage mixing system according to claim 2, wherein each of the plurality of control dials is associated with one of the first peristaltic pump, the second peristaltic pump, and the third peristaltic pump dictating a rate at which liquid is pumped.

4. The beverage mixing system according to claim 1, further including a dispensing tap, wherein upon opening of the dispensing tap pressure is released within the fluid line, which is sensed by the control system, and the plurality of pumps begin pumping liquid ingredients at predetermined rates.

5. The beverage mixing system according to claim 1, further including environmental sensors.

6. The beverage mixing system according to claim 5, further including pressure sensors, carbon dioxide sensors, and/or color sensors.

7. The beverage mixing system according to claim 1, further including pressure sensors, carbon dioxide sensors, and/or color sensors.

* * * * *